United States Patent
Lee et al.

(10) Patent No.: US 9,198,246 B2
(45) Date of Patent: Nov. 24, 2015

(54) LIGHTING DEVICE

(71) Applicants: GEOMETEK APPLICATION ENGINEERING CO., LTD., Zhubei, Hsinchu County (TW); Yun Lin Lee, Zhubei, Hsinchu County (TW)

(72) Inventors: Yu Lin Lee, Zhubei (TW); Lin Kan Weng, Zhubei (TW)

(73) Assignees: Lumigreen Lighting Technology Co., Ltd., Zhubei (TW); Yu Lin Lee, Zhubei (TW)

( * ) Notice: Subject to any disclaimer, the term of this patent is extended or adjusted under 35 U.S.C. 154(b) by 0 days.

(21) Appl. No.: 14/596,303

(22) Filed: Jan. 14, 2015

(65) Prior Publication Data

US 2015/0201474 A1    Jul. 16, 2015

(30) Foreign Application Priority Data

Jan. 14, 2014    (TW) .............................. 103101327 A

(51) Int. Cl.
| H05B 39/04 | (2006.01) |
| H05B 41/24 | (2006.01) |
| H05B 33/08 | (2006.01) |

(52) U.S. Cl.
CPC .................................. *H05B 33/0815* (2013.01)

(58) Field of Classification Search
None
See application file for complete search history.

(56) References Cited

U.S. PATENT DOCUMENTS

| 4,100,462 | A | * | 7/1978 | McLellan ...................... 315/179 |
| 4,284,925 | A | * | 8/1981 | Bessone et al. ............... 315/240 |
| 4,677,345 | A | * | 6/1987 | Nilssen ...................... 315/209 R |
| 4,701,680 | A | * | 10/1987 | Alley et al. ................... 315/287 |
| 4,772,824 | A | * | 9/1988 | Gulledge ...................... 315/291 |
| 5,047,690 | A | * | 9/1991 | Nilssen ......................... 315/224 |
| 5,164,637 | A | * | 11/1992 | Nilssen ...................... 315/209 R |
| 5,185,560 | A | * | 2/1993 | Nilssen ......................... 315/219 |
| 5,191,262 | A | * | 3/1993 | Nilssen ...................... 315/209 R |
| 5,214,355 | A | * | 5/1993 | Nilssen ......................... 315/219 |
| 5,214,356 | A | * | 5/1993 | Nilssen ......................... 315/224 |
| 5,329,204 | A | * | 7/1994 | Ricca ............................. 315/82 |
| 5,341,067 | A | * | 8/1994 | Nilssen ...................... 315/209 R |
| 5,428,266 | A | * | 6/1995 | Nilssen ...................... 315/209 R |
| 5,446,346 | A | * | 8/1995 | Nilssen ...................... 315/209 R |
| 5,469,028 | A | * | 11/1995 | Nilssen ......................... 315/291 |
| 5,491,385 | A | * | 2/1996 | Nilssen ......................... 315/178 |
| 5,512,801 | A | * | 4/1996 | Nilssen ...................... 315/209 R |
| 5,621,277 | A | * | 4/1997 | Ricca ............................. 315/86 |
| 5,723,951 | A | * | 3/1998 | Byszewski et al. ........... 315/174 |

(Continued)

*Primary Examiner* — Crystal L Hammond
(74) *Attorney, Agent, or Firm* — Alan D. Kamrath; Kamrath IP Lawfirm, P.A.

(57) ABSTRACT

A lighting device is provided. The lighting device includes a switch-mode power supply module, an electronic ballast power supply module, a first single-pole double-throw switch, a second single-pole double-throw switch, a third single-pole double-throw switch, a fourth single-pole double-throw switch, and a direct-current driven lighting module. The lighting device is connected with the ballast, one input of the ballast is connected to an AC power supply. The switch-mode power supply module and the electronic ballast power supply module are used to convert AC into DC. The common end of four single-pole double-throw switch is connected with the ballast. When the ballast is an inductive ballast, the common end of four single-pole double-throw switch is connected to the input of the switch-mode power supply module. When the ballast is the electronic ballast, the common end of four single-pole double-throw switch is connected to the output of the electronic ballast power modules.

9 Claims, 11 Drawing Sheets

(56) References Cited

U.S. PATENT DOCUMENTS

| | | | |
|---|---|---|---|
| 5,955,843 A * | 9/1999 | Nuckolls et al. | 315/86 |
| 6,002,210 A * | 12/1999 | Nilssen | 315/219 |
| 6,172,464 B1 * | 1/2001 | Nilssen | 315/56 |
| 6,211,625 B1 * | 4/2001 | Nilssen | 315/225 |
| 6,459,213 B1 * | 10/2002 | Nilssen | 315/224 |
| 6,667,585 B2 * | 12/2003 | O'Meara | 315/291 |
| 7,753,558 B2 * | 7/2010 | Ribarich | 362/260 |
| 7,868,561 B2 * | 1/2011 | Weightman et al. | 315/294 |
| 7,982,404 B2 * | 7/2011 | Gordin | 315/144 |
| 8,587,207 B2 * | 11/2013 | Chou et al. | 315/206 |
| 8,723,433 B2 | 5/2014 | Liu | |
| 2008/0150451 A1 * | 6/2008 | Gordin | 315/307 |
| 2009/0108765 A1 * | 4/2009 | Weightman et al. | 315/224 |
| 2011/0187286 A1 * | 8/2011 | Salvestrini et al. | 315/307 |
| 2014/0117871 A1 * | 5/2014 | Swatsky et al. | 315/246 |

* cited by examiner (a)

(b)

(c)

(a)

(b)

(c)

_

LIGHTING DEVICE

BACKGROUND OF THE INVENTION

1. Field of Invention

The present invention relates to a lighting device, more particularly relates to a lighting device having a direct-current driven lighting module.

2. Description of Related Art

The fluorescent lighting lamp in the present market usually has a ballast, and there are two styles of the ballast: an inductive ballast and an electronic ballast. A LED in a LED lighting bar needs to be driven by DC (direct current), thus a power supply module which can convert AC (alternating current) into DC shall be disposed in the LED lighting lamp for being connected to an AC power source. As a result, the LED lighting bar can be disposed in the fluorescent lighting lamp.

However, the inductive ballast and the electronic ballast are corresponding to the different power supply modules, the inductive ballast is only corresponding to a switch-mode power supply module, the electronic ballast is only corresponding to a specific power supply module, and no general power supply module in the present market is corresponding for the inductive ballast and the electronic ballast. Therefore, the manufacturing firm needs to prepare two kinds of the lighting lamp in stock to response the demand of clients. Furthermore, when the clients need to replace the lighting lamp and cannot identify the kinds of the ballast or the power supply module, the lighting lamp will be mounted incorrectly and cannot be turned on.

Furthermore, a direct-current driven lighting module in the lighting lamp, for example a light-emitting diode lighting module (also known as light bar), is composed of a plurality of the light-emitting diodes disposed on a circuit board, and the light-emitting diodes are coupled or electrical connected to each other in series and/or parallel via a printed wire on the circuit board. The light bar is used in the backlit of a LCD Monitor or used in a lamp. However, after the light-emitting diodes is mounted on the light bar, the connecting way of the light-emitting diodes is fixed or not adjusted, so the voltage-current characteristic of the light bar cannot be changed, and it is not flexible.

Therefore, a lighting device which is corresponding for the inductive ballast and the electronic ballast and a lighting module whose voltage-current characteristic is adjustable are desirous for a person skilled in the art.

SUMMARY OF THE INVENTION

One object of the present invention is to provide a lighting device and a direct-current driven lighting module. The lighting device is corresponding for both the inductive ballast and the electronic ballast, and the voltage-current characteristic of the lighting module is adjustable, thus that is more flexible.

To achieve the foregoing and other objects, the lighting device is provided. The lighting device comprises a switch-mode power supply module, an electronic ballast power supply module, a first single-pole double-throw switch, a second single-pole double-throw switch, a third single-pole double-throw switch, a fourth single-pole double-throw switch, and a direct-current driven lighting module.

The lighting device is connected with a ballast, an input of the ballast is connected to an AC power supply, and the ballast has four outputs: a L1 end, a L2 end, a N1 end, and a N2 end. The switch-mode power supply module has four inputs: a L1S end, a L2S end, a N1S end, and a N2S end. The switch-mode power supply module is used to convert the AC into DC, and the electronic ballast power supply module and the switch-mode power supply module are connected in parallel. The electronic ballast power supply module has four inputs: a L1T end, a L2T end, a N1T end, and a N2T end, and the electronic ballast power supply module is used to convert AC into DC.

The first single-pole double-throw switch has a common end and two output end, the common end is connected with the L1 end of the ballast, one output end of the first single-pole double-throw switch is connected with the L1S end of the switch-mode power supply module, another output end of the first single-pole double-throw switch is connected with the L1T end of the electronic ballast power supply module.

The second single-pole double-throw switch has a common end and two output end, the common end of the second single-pole double-throw switch is connected with the L2 end of the ballast, one output end of the second single-pole double-throw switch is connected with the L2S end of the switch-mode power supply module, the other output end of the second single-pole double-throw switch is connected with the L2T end of the electronic ballast power supply module.

The third single-pole double-throw switch has a common end and two output end, the common end of the third single-pole double-throw switch is connected with the N1 end of the ballast, one output end of the third single-pole double-throw switch is connected with the N1S end of the switch-mode power supply module, the other output end of the third single-pole double-throw switch is connected with the N1T end of the electronic ballast power supply module.

The fourth single-pole double-throw switch has a common end and two output end, the common end of the fourth single-pole double-throw switch is connected with the N2 end of the ballast, one output end of the fourth single-pole double-throw switch is connected with the N2S end of the switch-mode power supply module, the other output end of the fourth single-pole double-throw switch is connected with the N2T end of the electronic ballast power supply module.

In the lighting device, the direct-current driven lighting module of the lighting device comprises n direct-current driven light-emitting elements $D_1, \ldots, D_n$ arranged in sequence and $2 \times (n-1)$ single-pole double-throw switches $S_{11}, S_{12}, \ldots, S_{(n-1)1}, S_{(n-1)2}$, and n is an integer greater than 1. Each light-emitting element has a high voltage end and a low voltage end, and each single-pole double-throw switch has a parallel coupling pole, a serial coupling pole, and the public pole. The high voltage end of the light-emitting element $D_i$ is connected to the parallel coupling pole of the single-pole double-throw switch $S_{i1}$, the low voltage end of the light-emitting element $D_i$ is connected to the public pole of the single-pole double-throw switch $S_{i2}$, the serial coupling pole of the single-pole double-throw switch $S_{i1}$ is connected to the serial coupling pole of the single-pole double-throw switch $S_{i2}$, the high voltage end of the light-emitting element $D_{i+1}$ is connected to the public pole of the single-pole double-throw switch $S_{i1}$, the low voltage end of the light-emitting element $D_{i+1}$ is connected to the parallel coupling pole of the single-pole double-throw switch $S_{i2}$, i is an integer ranged from $1 \sim (n-1)$, the high voltage end of the light-emitting element $D_1$ and the low voltage end of the light-emitting element $D_n$ are connected to the positive pole and the negative pole of the direct-current source, respectively.

In the lighting module, each light-emitting element is a light-emitting diode, the high voltage end and the low voltage end of each light-emitting element are a positive pole and a negative pole of the light-emitting diode, respectively.

In the lighting module, each light-emitting element comprises multiple subsidiary light-emitting elements and these subsidiary light-emitting elements are serial and/or parallel connected to each other. Each single-pole double-throw switch is embodied as a DIP switch or a transistor.

In the lighting module, m number of single-pole double-throw switches of the 2×(n−1) single-pole double-throw switches $S_{11}, S_{12}, \ldots, S_{(n-1)1}, S_{(n-1)\,2}$ are embodied as one m-pole double-throw (mpst) switch, and m is an integer greater than 1. In the other embodiment, the 2×(n−1) single-pole double-throw switches $S_{11}, S_{12}, \ldots, S_{(n-1)1}, S_{(n-1)2}$ are embodied as a r-pole s-throw (rpst) switch, r and s are positive integer. The r-pole s-throw (rpst) switch is such as 1P2T, 1P3T, 2P4T, 2P6T, 2P8T, and so on.

In the lighting module, if the public poles of two single-pole double-throw switches are connected to the parallel coupling pole, and the two single-pole double-throw switches are connected between two neighboring light-emitting elements, the two neighboring light-emitting elements are parallel connected to each other; if the public pole of two single-pole double-throw switches are connected to serial coupling pole, and the two single-pole double-throw switches are connected between two neighboring light-emitting elements, the two neighboring light-emitting elements are serially connected to each other.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
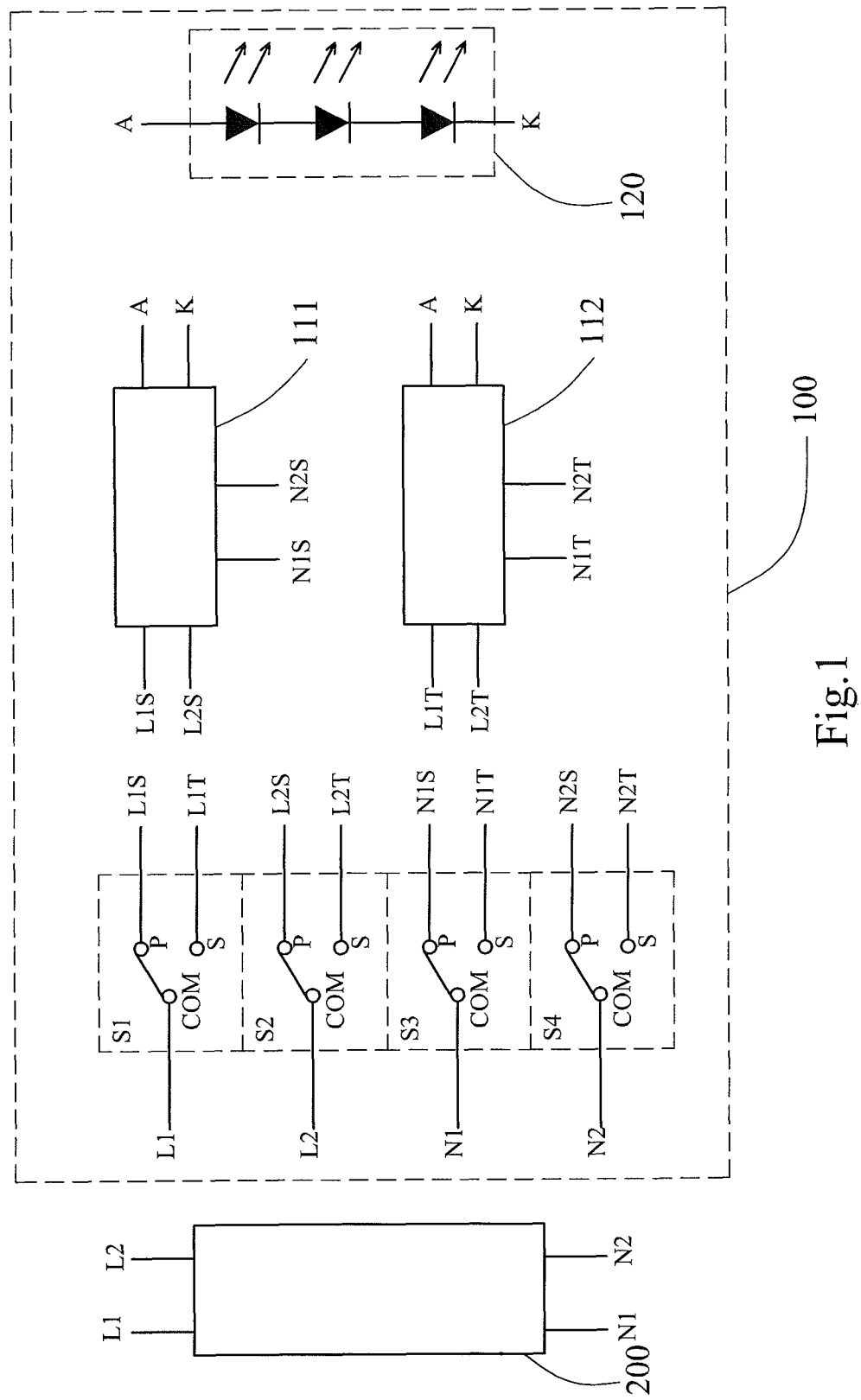
FIG. 1 illustrates the lighting device 100 electrically connected with the ballast 200.

Please refer to FIG. 1 which illustrates the lighting device 100 electrically connected with the ballast 200. The lighting device 100 comprises a first single-pole double-throw switch S1, a second single-pole double-throw switch S2, a third single-pole double-throw switch S3, a fourth single-pole double-throw switch S4, a switch-mode power supply module 111, an electronic ballast power supply module 112, and a lighting module 120. The ballast 200 has four outputs: a L1 end, a L2 end, a N1 end, and a N2 end. The switch-mode power supply module 111 has a L1S end, a L2S end, a N1S end, a N2S end, a positive pole A, and a negative pole K. The electronic ballast power supply module 112 has a L1T end, a L2T end, a N1T end, a N2T end, a positive pole A, and a negative pole K. The first single-pole double-throw switch S1 has a common end COM, an output end P, and an output end S. The second single-pole double-throw switch S2 has a common end COM, an output end P, and an output end S. The third single-pole double-throw switch S3 has a common end COM, an output end P, and an output end S. The fourth single-pole double-throw switch S4 has a common end COM, an output end P, and an output end S. The lighting module 120 comprises multiple light-emitting diodes D, a positive pole A, and a negative pole K.

The common end COM of the first single-pole double-throw switch S1 is connected to the L1 end of the ballast, the output end P is connected to the L1S end of the switch-mode power supply module 111, and the output end S is connected to the L1T end of the electronic ballast power supply module 112. The common end COM of the second single-pole double-throw switch S2 is connected to the L2 end of the ballast, the output end P is connected to the L2S end of the switch-mode power supply module 111, and the output end S is connected to the L2T end of the electronic ballast power supply module 112. The common end COM of the third single-pole double-throw switch S3 is connected to the N1 end of the ballast, the output end P is connected to the N1S end of the switch-mode power supply module 111, the output end S is connected to the N1T end of the electronic ballast power supply module 112. The common end COM of the fourth single-pole double-throw switch S4 is connected to the N2 end of the ballast, the output end P is connected to the N2S end of the switch-mode power supply module 111, the output end S is connected to the N2T end of the electronic ballast power supply module 112.

In addition, the positive pole A of the lighting module 120 is connected to the positive pole A of the switch-mode power supply module 111 and the positive pole A of the electronic ballast power supply module. The negative pole K of the lighting module 120 is connected to the negative pole K of the switch-mode power supply module 111 and the negative pole K of the electronic ballast power supply module.

An inductive ballast is only corresponding for the switch-mode power supply module. When the ballast 200 is the inductive ballast, the common end COM of the first single-pole double-throw switch S1 is connected to the L1S end of the switch-mode power supply module 111. The common end COM of the second single-pole double-throw switch S2 is connected to the L2S end of the switch-mode power supply module 111, the common end COM of the third single-pole double-throw switch S3 is connected to the N1S end of the switch-mode power supply module 111, the common end COM of the fourth single-pole double-throw switch S4 is connected to the N2S end of the switch-mode power supply module 111. As a result, the ballast 200 is electrically connected to the switch-mode power supply module 111 via the four single-pole double-throw switches, and is not electrically connected with the electronic ballast power supply module 121, and the lighting device 100 will be operated normally.

Figure 2:
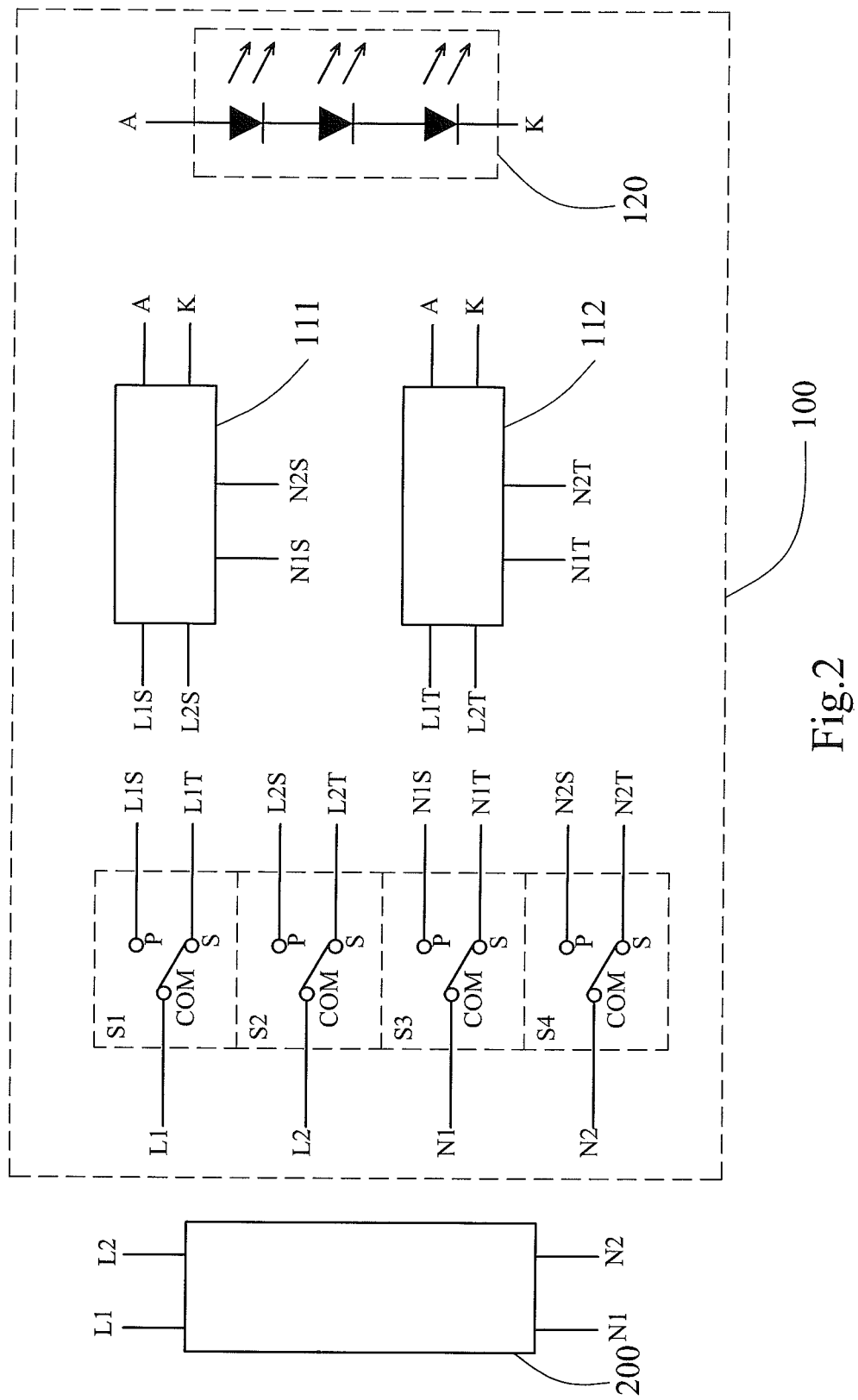
FIG. 2 illustrates the lighting device 100 electrically connected with the electronic ballast.

Please refer to FIG. 2 which illustrates the lighting device 100 electrically connected to the electronic ballast. The electronic ballast is only corresponding to the electronic ballast power supply module 112. When the ballast 200 is the electronic ballast, the common end COM of the first single-pole double-throw switch S1 is connected to the L1T end of the electronic ballast power supply module 112, the common end COM of the second single-pole double-throw switch S2 is connected to the L2T end of the electronic ballast power supply module 112, the common end COM of the third single-pole double-throw switch S3 is connected to the N1T end of the electronic ballast power supply module 112, the common end COM of the fourth single-pole double-throw switch S4 is connected to the N2T end of the electronic ballast power supply module 112. As a result, the ballast 200 is electrically connected to the electronic ballast power supply module 112 through four single-pole double-throw switches, and is not electrically connected with the switch-mode power supply module 111, and the lighting device 100 will be normally operated. In the present invention, the electronic ballast power supply module 112 is such as the power transformation apparatus disclosed by the patent U.S. Pat. No. 8,723,433.

Figure 3:
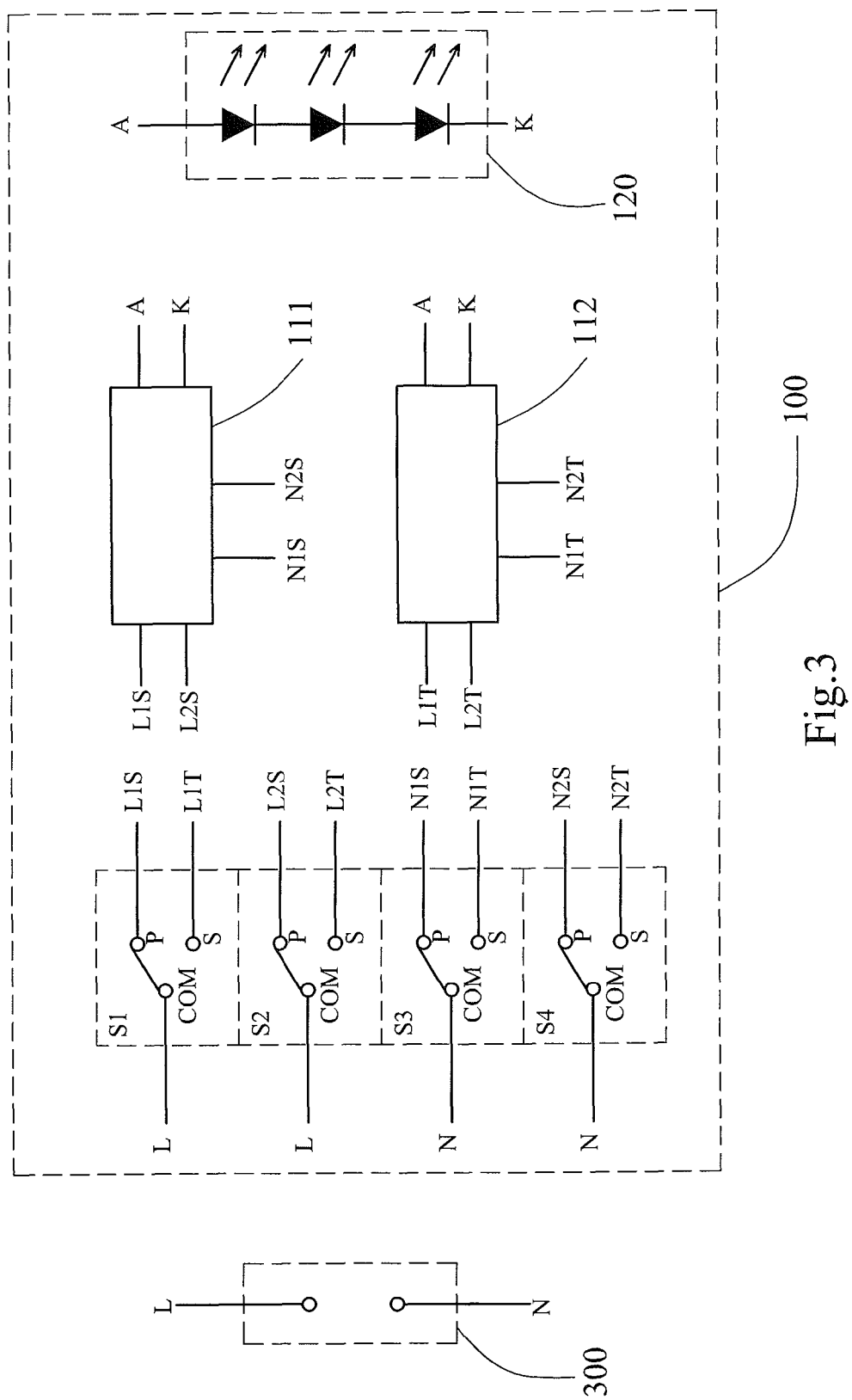
FIG. 3 illustrates the lighting device 100 electrically connected with the AC power supply 300 directly.

Please refer to FIG. 3 which illustrates the lighting device 100 electrically connected with the AC power supply 300 directly, i.e. connected with the AC power supply 300 without any power supply module. The AC power has a output end L and a output end N, the output end L is connected to the common end COM of the first single-pole double-throw switch S1 and the second single-pole double-throw switch S2, and the output end N is connected to the common end COM of the third single-pole double-throw switch S3 and the fourth single-pole double-throw switch S4. When the lighting device 100 is connected with the AC power supply 300 directly, the common end COM of the first single-pole double-throw switch S1 is connected to the L1S end of the switch-mode power supply module 111, the common end COM of the second single-pole double-throw switch S2 is connected to the L2S end of the switch-mode power supply module 111, the common end COM of the third single-pole double-throw switch S3 is connected to the N1S end of the switch-mode power supply module 111, and the common end COM of the fourth single-pole double-throw switch S4 is connected to the N2S end of the switch-mode power supply module 111. As a result, the AC power supply 300 is electrically connected to the switch-mode power supply module 111 through four single-pole double-throw switches, and the AC is converted by the switch-mode power supply module 111 into DC, so as to turn on the light-emitting diodes D of the lighting module 130.

When the ballast electrically connecting with the lighting device 100 is transferred from the inductive ballast to the electronic ballast, the single-pole double-throw switches S1~S4 would be switched manually or automatically. In the embodiment of automatically switched single-pole double-throw switches S1~S4, a relay is deployed for executing the automatic switched action of the single-pole double-throw switches S1~S4. In the embodiment, the relay is electrically connected to the power source via an AC/DC converter, and the AC/DC converter is electrically connected to a capacitor in series. An impedance value of the capacitor is inversely proportional to the frequency of the current passing through, so when the lighting device 100 is electrically connected to the inductance ballast or the AC power supply 300 directly, the frequency is small and the voltage drop across the capacitor is large. Thus, a voltage applied on the relay is smaller than the start voltage thereof, and the single-pole double-throw switches S1~S4 would be kept on the state shown in FIG. 1 or FIG. 3. Conversely, when the lighting device 100 is electrically connected to the electrical ballast, the frequency becomes large and the voltage drop across the capacitor is reduced, therefore the voltage applied on the relay is larger than the start voltage thereof, and the single-pole double-throw switches S1~S4 would be switched to the state shown in FIG. 2.

In the above-mentioned embodiments, the direct-current driven lighting module 120 is comprised of light-emitting elements arranged in series. However, in other embodiment, the direct-current driven lighting module comprises n direct-current driven light-emitting elements arranged in sequence $D_1, \ldots, D_n$ and $2\times(n-1)$ single-pole double-throw switches $S_{11}, S_{12}, \ldots, S_{(n-1)1}, S_{(n-1)2}$, where n is an integer greater than 1. Each light-emitting element has a high voltage end and a low voltage end, and each single-pole double-throw switch has a parallel coupling pole, a serial coupling pole, and the public pole. The high voltage end of the light-emitting element $D_i$ is connected to the parallel coupling pole of the single-pole double-throw switch $S_{i1}$, the low voltage end of the light-emitting element $D_i$ is connected to the public pole of the single-pole double-throw switch $S_{i2}$, the serial coupling pole of the single-pole double-throw switch $S_{i1}$ is connected to the serial coupling pole of the single-pole double-throw switch $S_{i2}$, the high voltage end of the light-emitting element $D_{i+1}$ is connected to the public pole of the single-pole double-throw switch $S_{i1}$, the low voltage end of the light-emitting element $D_{i+1}$ is connected to the parallel coupling pole of the single-pole double-throw switch $S_{i2}$, i is an integer ranged from 1~(n−1), and the high voltage end of the light-emitting element $D_1$ and the low voltage end of the light-emitting element $D_n$ are connected to the positive pole and negative pole of the direct-current, respectively. In the direct-current driven lighting module of following embodiments in the present invention, each light-emitting element is a light-emitting diode (LED), and the above-mentioned high voltage end and low voltage end of each light-emitting element is the positive pole and the negative pole of the light-emitting diode, respectively.

Figure 4:
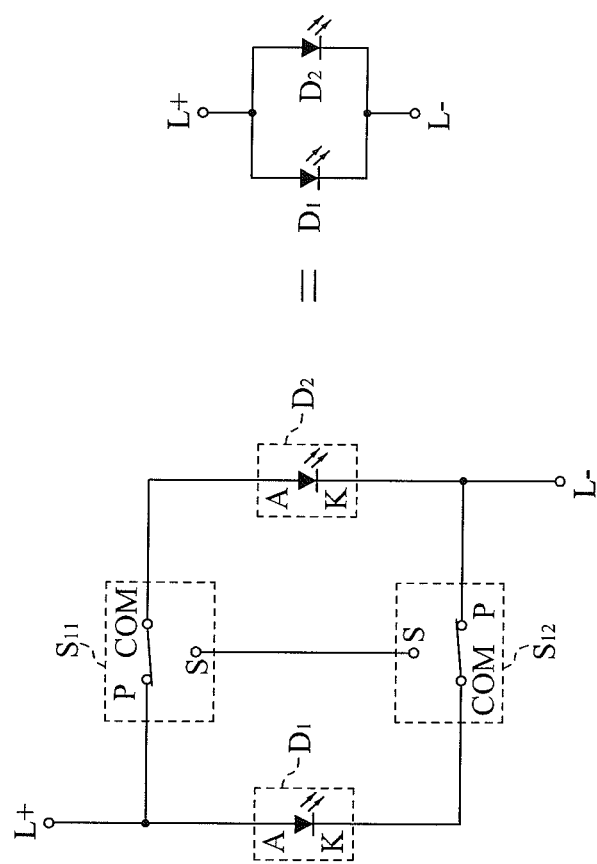
FIG. 4 illustrates a circuit diagram of the direct-current driven lighting module in accordance with embodiment of the present invention and its equivalent circuit diagram.

FIG. 4 illustrates a circuit diagram of the direct-current driven lighting module in accordance with an embodiment of the present invention and its equivalent circuit diagram. Please refer to the left diagram of the FIG. 4, in the present embodiment, n is 2, and i is 1, so the direct-current driven lighting module comprises two light-emitting diodes $D_1, D_2$ arranged in sequence and two single-pole double-throw switches $S_{11}, S_{12}$. Each light-emitting diode has the positive pole A and the negative pole K, each single-pole double-throw switch has a parallel pole P, a serial pole S, and a public pole COM, and each single-pole double-throw switch is embodied as a DIP switch or an transistor. The positive pole A of the light-emitting diodes $D_1$ is connected to the parallel pole P of the single-pole double-throw switch $S_{11}$, the negative pole K of the light-emitting diode $D_1$ is connected to the public pole COM of the single-pole double-throw switch $S_{12}$, the serial pole S of the single-pole double-throw switch $S_{11}$ is connected to the serial pole S of the single-pole double-throw switch $S_{12}$, the positive pole A of the light-emitting diode $D_2$ is connected to the public pole COM of the single-pole double-throw switch $S_{11}$, the negative pole K of the light-emitting diode $D_2$ is connected to the parallel pole P of the single-pole double-throw switch $S_{11}$, and the positive pole A of the light-emitting diode $D_2$ and the negative pole K of the light-emitting diode $D_2$ are connected to a plus pole L+ and a minus pole L− of the direct-current source (not shown), respectively.

In the lighting module, the public poles COM of two single-pole double-throw switches $S_{11}, S_{12}$ connected between the light-emitting diodes $D_1, D_2$ are both connected to the parallel pole P, so as to make the light-emitting diodes $D_1$, $D_2$ being connected in parallel, and the equivalent circuit diagram of the lighting module is shown the right diagram of the FIG. 4.

Figure 5:
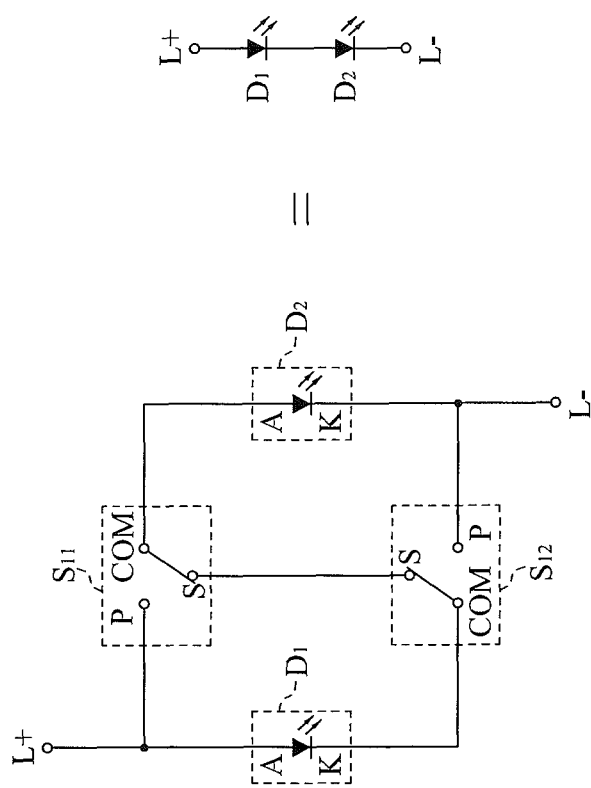
FIG. 5 is another circuit diagram of the direct-current driven lighting module shown in FIG. 4 and its equivalent circuit diagram.

FIG. 5 is another circuit diagram of the direct-current driven lighting module shown in FIG. 4 and its equivalent circuit diagram. Please refer to the left diagram of FIG. 5, in the lighting module, the public poles COM of two single-pole double-throw switches $S_{11}$, $S_{12}$ connected between the light-emitting diodes $D_1$, $D_2$ are connected to the serial pole S, so as to make the light-emitting diodes $D_1$, $D_2$ being connected in series, and its equivalent circuit diagram of the lighting module is shown in the right diagram of the FIG. 5.

Therefore, from FIG. 4 and FIG. 5, by changing the switching types of the single-pole double-throw switches $S_{11}$, $S_{12}$, the connecting way, serial coupling or parallel coupling, between the light-emitting diodes $D_1$, $D_2$ in direct-current driven lighting module could be switched, so as to adjust the voltage-current characteristic of the lighting module, and it is flexible.

Figure 6:
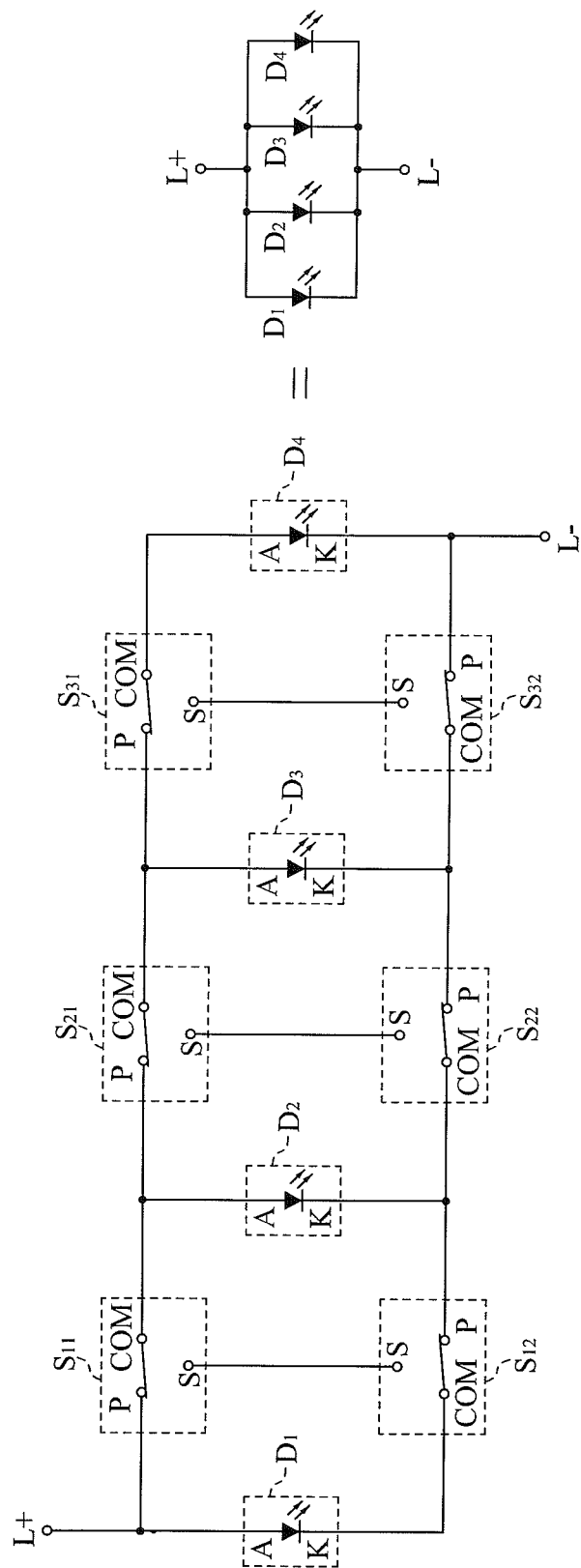
FIG. 6 illustrates a circuit diagram of the direct-current driven lighting module in accordance with another embodiment of the present invention and its equivalent circuit diagram.

FIG. 6 illustrates a circuit diagram of the direct-current driven lighting module in accordance with another embodiment of the present invention and its equivalent circuit diagram. Please refer to the left diagram of the FIG. 6, in the present embodiment, n is 4 and i is an integer ranged from 1~3, so the direct-current driven lighting module comprises four light-emitting diodes $D_1, \ldots, D_4$ arranged in sequence and six single-pole double-throw switches $S_{11}, S_{12}, \ldots, S_{31}, S_{32}$. Each light-emitting diode has the positive pole A and the negative pole K, each single-pole double-throw switch has the parallel pole P, the serial pole S, and public pole COM, and each single-pole double-throw switch is embodied as a DIP switch or a transistor.

When i is 1, the positive pole A of the light-emitting diode $D_1$ is connected to the parallel pole P of the single-pole double-throw switch $S_{11}$, the negative pole K of the light-emitting diode $D_1$ is connected to the public pole COM of the single-pole double-throw switch $S_{12}$, the serial pole S of the single-pole double-throw switch $S_{11}$ is connected to the serial pole S of the single-pole double-throw switch $S_{12}$, the positive pole A of the light-emitting diode $D_2$ is connected to the public pole COM of the single-pole double-throw switch $S_{11}$, the negative pole K of the light-emitting diode $D_2$ is connected to the parallel pole P of the single-pole double-throw switch $S_{12}$.

When i is 2, the positive pole A of the light-emitting diode $D_2$ is connected to the parallel pole P of the single-pole double-throw switch $S_{21}$, the negative pole K of the light-emitting diode $D_2$ is connected to the public pole COM of the single-pole double-throw switch $S_{22}$, the serial pole S of the single-pole double-throw switch $S_{21}$ is connected to the serial pole S of the single-pole double-throw switch $S_{22}$, the positive pole A of the light-emitting diode $D_3$ is connected to the public pole COM of the single-pole double-throw switch $S_{21}$, the negative pole K of the light-emitting diode $D_3$ is connected to the parallel pole P of the single-pole double-throw switch $S_{22}$.

When i is 3, the positive pole A of the light-emitting diode $D_3$ is connected to the parallel pole P of the single-pole double-throw switch $S_{31}$, the negative pole K of the light-emitting diode $D_{31}$ is connected to the public pole COM of the single-pole double-throw switch $S_{32}$, the serial pole S of the single-pole double-throw switch $S_{31}$ is connected to the serial pole S of the single-pole double-throw switch $S_{32}$, the positive pole A of the light-emitting diode $D_4$ is connected to the public pole COM of the single-pole double-throw switch $S_{31}$, the negative pole K of the light-emitting diode $D_4$ is connected to the parallel pole P of the single-pole double-throw switch $S_{32}$.

Furthermore, the positive pole A of the light-emitting diode $D_1$ and the negative pole K of the light-emitting diode $D_4$ are connected to the plus pole L+ and the minus pole L− of the direct-current source (not shown), respectively.

In the lighting module, the public poles COM of the single-pole double-throw switches $S_{11}$, $S_{12}$, $S_{21}$, $S_{22}$, $S_{31}$, $S_{32}$ connected between the light-emitting diodes $D_1$, $D_2$, $D_3$, $D_4$ are all connected to the parallel pole P, so as to make the light-emitting diodes $D_1$, $D_2$, $D_3$, $D_4$ connected in parallel, and its equivalent circuit diagram of the lighting module is shown in the right diagram of the FIG. 6.

Figure 7:
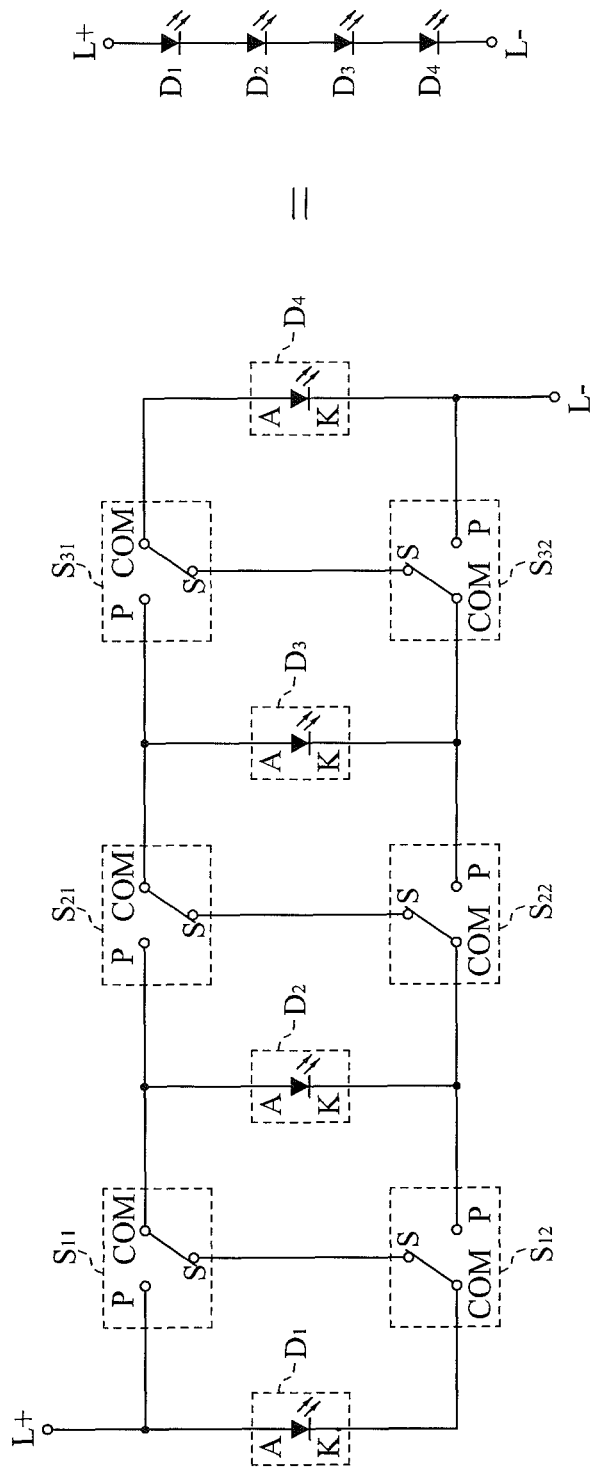
FIG. 7 and FIG. 8 illustrate other circuit diagrams of the direct-current driven lighting module shown in FIG. 6 and their equivalent circuit diagrams.
Figure 8:
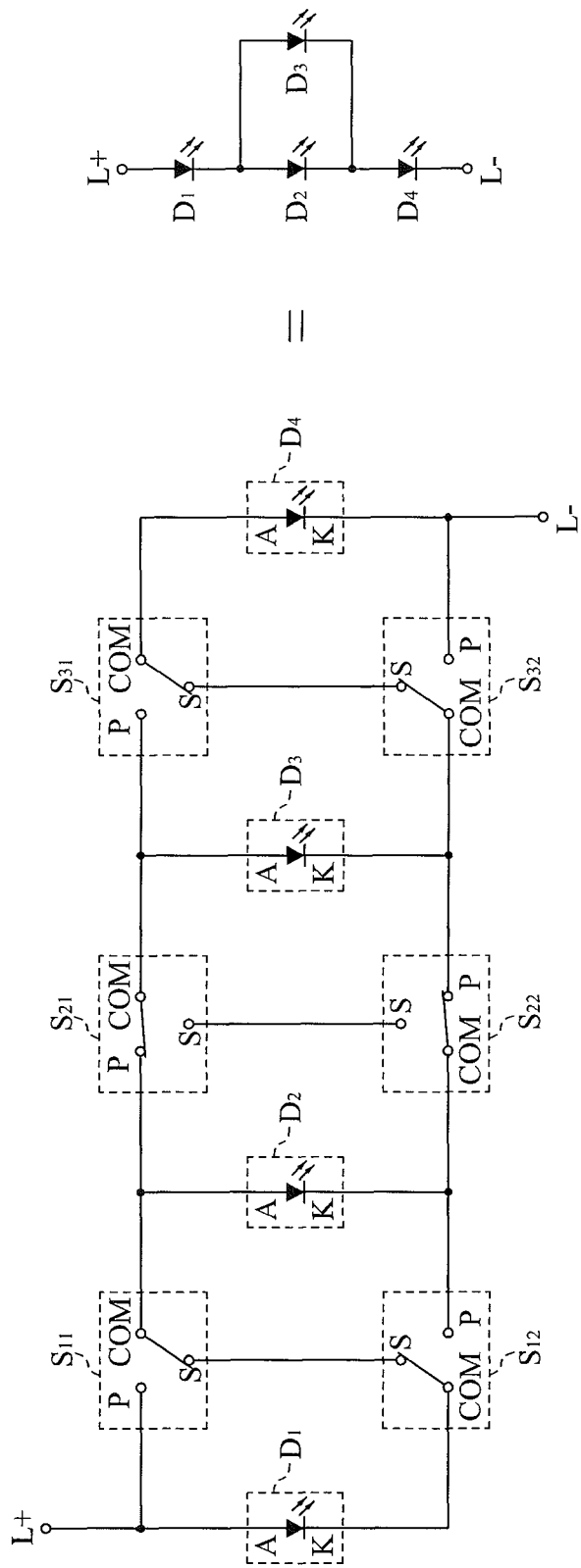

FIG. 7 and FIG. 8 illustrate circuit diagrams and equivalent circuit diagrams of the lighting module in other switching types. Please refer to the left diagram of the FIG. 7, in the lighting module, the public poles COM of the single-pole double-throw switches $S_{11}$, $S_{12}$, $S_{21}$, $S_{22}$, $S_{31}$, $S_{32}$ connected between the light-emitting diodes $D_1$, $D_2$, $D_3$, $D_4$ are all connected to the serial pole S, so as to make the light-emitting diodes $D_1$, $D_2$, $D_3$, $D_4$ being connected in series, and its equivalent circuit diagram of the lighting module is shown in the right diagram of the FIG. 7.

Please refer to the left diagram of the FIG. 8, in the lighting module, the public poles COM of two single-pole double-throw switches $S_{11}$, $S_{12}$ connected between two neighboring light-emitting diodes $D_1$, $D_2$ are connected to the serial pole S, so as to make the light-emitting diodes $D_1$, $D_2$ being connected in series, the public pole COM of two single-pole double-throw switches $S_{21}$, $S_{22}$ connected between two neighboring light-emitting diodes $D_2$, $D_3$ are connected to the parallel pole P, so as to make the light-emitting diodes $D_2$, $D_3$ being connected in parallel, and the public poles COM of two single-pole double-throw switches $S_{31}$, $S_{32}$ connected between two neighboring light-emitting diodes $D_3$, $D_4$ are connected to the serial pole S, so as to make the light-emitting diodes $D_3$, $D_4$ being connected in series, its equivalent circuit diagram of the lighting module is shown in the right diagram of the FIG. 8, the light-emitting diodes $D_1$, $D_2$, $D_4$ are connected in series, and the light-emitting diodes $D_3$ and $D_2$ are connected in parallel.

Therefore, from the description of FIG. 6 to FIG. 8, by changing the switching types of the single-pole double-throw switches $S_{11}$, $S_{12}$, $S_{21}$, $S_{22}$, $S_{31}$, $S_{32}$, the connecting way, serial coupling or parallel coupling, between the light-emitting diodes $D_1$, $D_2$, $D_3$, $D_4$ in direct-current driven lighting module could be switched, so as to adjust the voltage-current characteristic of the lighting module, and it is flexible.

Figure 9:
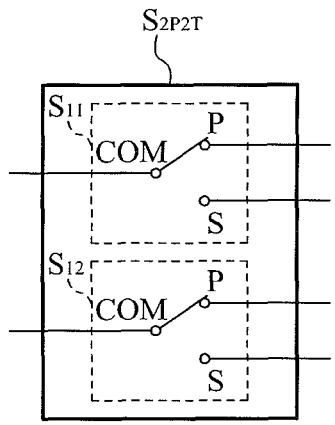
FIG. 9. illustrates a circuit schematic diagram of an alternative embodiment of the single-pole double-throw switch of the lighting module shown in FIG. 4.

FIG. 9. illustrates a circuit schematic diagram of an alternative embodiment of the single-pole double-throw switch of the lighting module shown in FIG. 4. Please refer to the FIG. 9, the single-pole double-throw switches $S_{11}$, $S_{12}$ of the lighting module in FIG. 4 are embodied as a double-pole double-throw switch (DPDT or 2P2T) $S_{2P2T}$.

Figure 10:
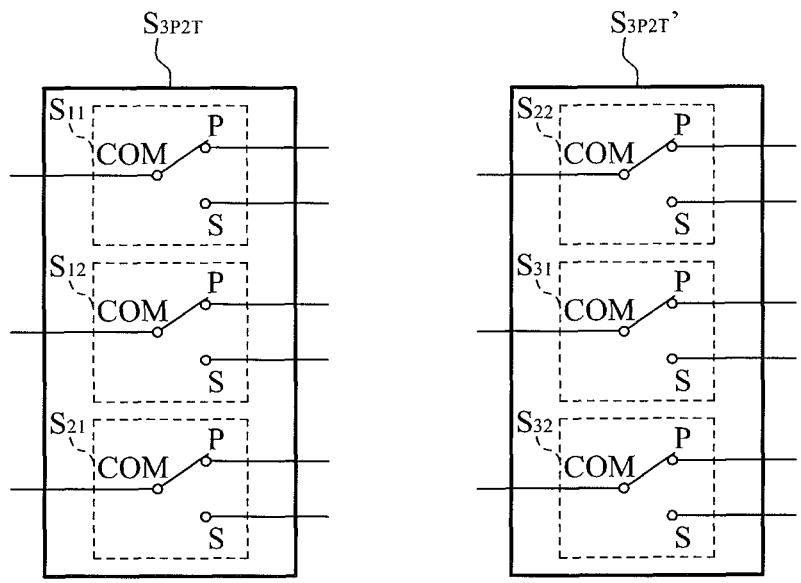
FIG. 10 illustrates a circuit schematic diagram of an alternative embodiment of multiple single-pole double-throw switches of the lighting module shown in FIG. 6.
Figure 10:
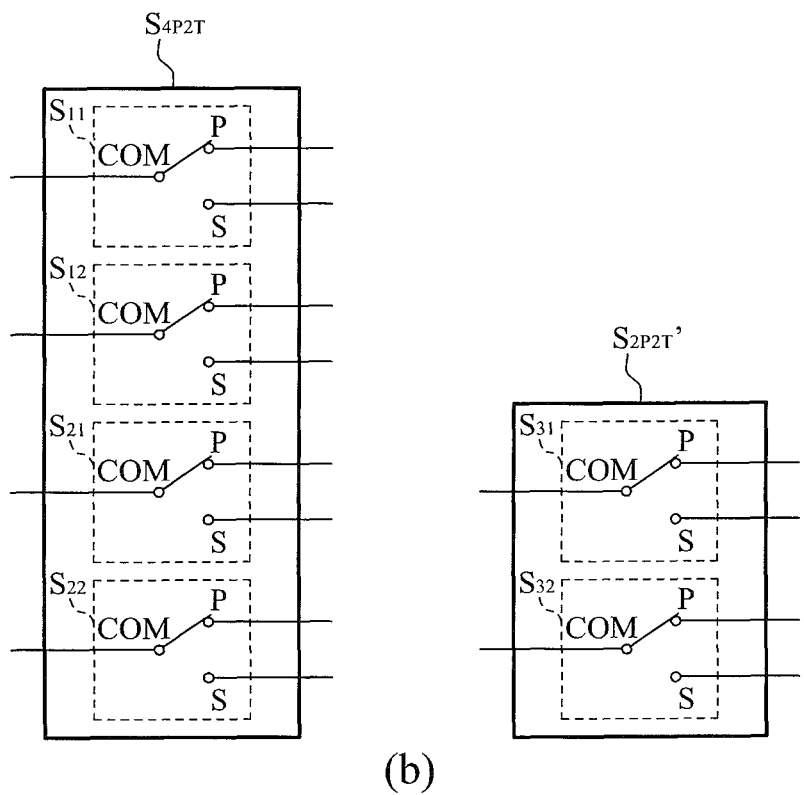
Figure 10:
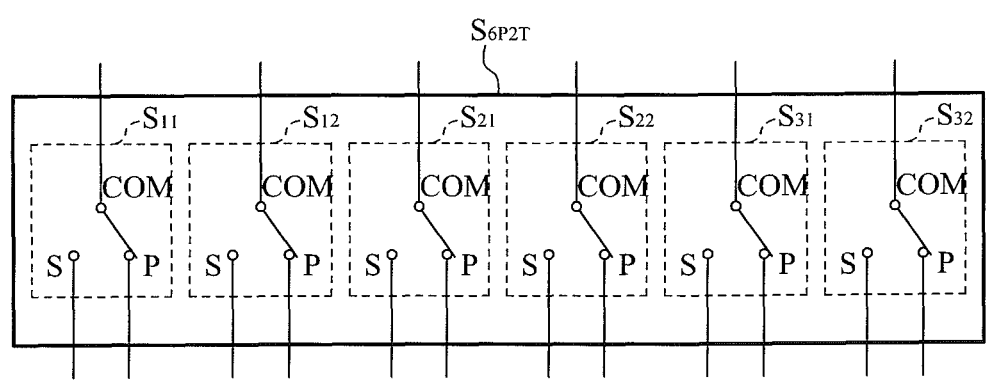

FIG. 10 illustrates a circuit schematic diagram of an alternative embodiment of multiple single-pole double-throw switches of the lighting module shown is FIG. 9. It is noted that the single-pole double-throw switches $S_{11}$, $S_{12}$, $S_{21}$, $S_{22}$, $S_{31}$, $S_{32}$ of the lighting module shown in FIG. 6 can be embodied as three single-pole double-throw switches shown in FIG. 9. Please refer to FIG. 10 (a), the three single-pole double-throw switches $S_{11}$, $S_{12}$, $S_{21}$ of the single-pole double-throw switches $S_{11}$, $S_{12}$, $S_{21}$, $S_{22}$, $S_{31}$, $S_{32}$ of the lighting module shown in FIG. 6 are embodied as a triple-pole double-throw (TPDT or 3P2T) switch $S_{3P2T}$, and the three single-pole double-throw switches $S_{22}$, $S_{31}$, $S_{32}$ are embodied as another triple-pole double-throw switch $S_{3P2T}'$. Please refer to FIG. 10 (b), the four single-pole double-throw switches $S_{11}$, $S_{12}$, $S_{21}$, $S_{22}$ of the single-pole double-throw switches $S_{11}$, $S_{12}$, $S_{21}$, $S_{22}$, $S_{31}$, $S_{32}$ of the lighting module shown in FIG. 6 are embodied as a quadruple-pole double-throw (QPDT or 4P2T) switch $S_{4P2T}$, and the two single-pole double-throw switches $S_{31}$, $S_{32}$ are embodied as the double-pole double-throw switch $S_{2P2T}'$. Please refer to FIG. 10 (c), the single-pole double-throw switches $S_{11}$, $S_{12}$, $S_{21}$, $S_{22}$, $S_{31}$, $S_{32}$ of the lighting module shown in FIG. 6 are embodied as a 6-pole double-throw (6P2T) switch $S_{6P2T}$.

Figure 11:
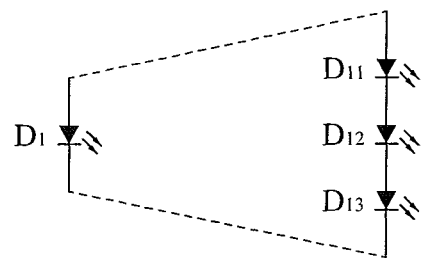
FIG. 11 illustrates several circuit schematic diagrams of the light-emitting elements of the direct-current driven lighting modules in accordance with embodiments of the present invention.
Figure 11:
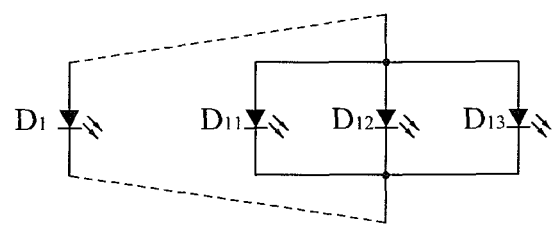
Figure 11:
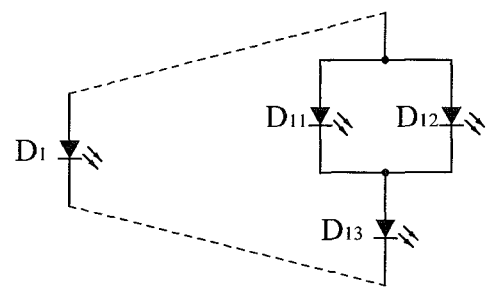

FIG. 11 illustrates several circuit schematic diagrams of light-emitting elements of the direct-current driven lighting modules in accordance with embodiments of the present invention. Please refer to the FIG. 11, for example the light-emitting diode D1 is composed of multiple subsidiary light-emitting elements connected in series or in parallel. Shown in FIG. 11 (a), the light-emitting diode $D_1$, is composed of the subsidiary light-emitting elements $D_{11}$, $D_{12}$, $D_{13}$ connected in series. Shown in FIG. 11 (b), the light-emitting diode $D_1$ is composed of the subsidiary light-emitting elements $D_{11}$, $D_{12}$, $D_{13}$ connected in parallel. Shown in FIG. 11 (c), the subsidiary light-emitting elements $D_{11}$, $D_{12}$, $D_{13}$ are similar elements with the light-emitting diode $D_1$, or are different elements from the light-emitting diode $D_1$.

In sum up, by changing the switching types of the single-pole double-throw switches to alter the connecting way (serial or parallel coupling) between the light-emitting diodes, the voltage-current characteristic of the lighting module can be adjusted, and it is convenient and flexible.

The person having ordinary skill in the art would readily observe that numerous modifications and alternatives of the device and method may be made while retaining the teachings of the invention. For example, if the direct-current driven lighting module comprises three or above light-emitting diodes arranged in sequence of the present invention, besides of using the single-pole double-throw switches shown in FIG. 6 to FIG. 8, the multiple-pole double-throw (mP2T, m is an integer greater than 1) switch shown in FIG. 9 and a r-pole s-throw (rPsT, r and s are both an integer) switches can also be used in the lighting module, so as to achieve serial coupling and the parallel coupling between the light emitting diodes. Accordingly, the above disclosure should be construed as limited only by the meters and bounds of the appended claims.

What is claimed is:

1. A lighting device, configured to connect with a ballast, an input of the ballast connected to an AC power supply, the ballast has four outputs of a L1 end, a L2 end, a N1 end, and a N2 end, the lighting device comprising:
a switch-mode power supply module, having four inputs of a L1S end, a L2S end, a N1S end, and a N2S end, the switch-mode power supply module is configured to convert AC into DC;
an electronic ballast power supply module, connected with the switch-mode power supply module in parallel, the electronic ballast power supply module having four inputs of a L1T end, a L2T end, a N1T end, and a N2T end, and the electronic ballast power supply module configured to convert AC into DC;
a first single-pole double-throw switch, having a common end and two output ends, the common end thereof connected with the L1 end of the ballast, one output end of the first single-pole double-throw switch connected with the L1S end of the switch-mode power supply module, and the other output end of the first single-pole double-throw switch connected with the L1T end of the electronic ballast power supply module;
a second single-pole double-throw switch, having a common end and two output ends, the common end thereof connected with the L2 end of the ballast, one output end of the second single-pole double-throw switch connected with the L2S end of the switch-mode power supply module, and the other output end of the second single-pole double-throw switch connected with the L2T end of the electronic ballast power supply module;
a third single-pole double-throw switch, having a common end and two output ends, the common end thereof connected with the N end of the ballast, one output end of the third single-pole double-throw switch connected with the N1S end of the switch-mode power supply module, and the other output end of the third single-pole double-throw switch connected with the N1T end of the electronic ballast power supply module;
a fourth single-pole double-throw switch, having a common end and two output ends, the common end thereof is connected with the N2 end of the ballast, one output end of the fourth single-pole double-throw switch connected with the N2S end of the switch-mode power supply module, and the other output end of the fourth single-pole double-throw switch connected with the N2T end of the electronic ballast power supply module; and
a direct-current driven lighting module, comprising n direct-current driven light emitting elements $D_1, \ldots, D_n$ arranged in sequence;
wherein, when the ballast is an inductive ballast, the common end of the first single-pole double-throw switch is connected to the L1S end of the switch-mode power supply module, the common end of the second single-pole double-throw switch is connected to the L2S end of the switch-mode power supply module, the common end of the third single-pole double-throw switch is connected to the N1S end of the switch-mode power supply module, and the common end of the fourth single-pole double-throw switch is connected to the N2S end of the switch-mode power supply module;
when the ballast is an electronic ballast, the common end of the first single-pole double-throw switch is connected to the L1T end of the electronic ballast, the common end of the second single-pole double-throw switch is connected to the L2T end of the electronic ballast, the common end of the third single-pole double-throw switch is connected to the N1T end of the electronic ballast, and the common end of the fourth single-pole double-throw switch is connected to the N2T end of the electronic ballast.

2. The lighting device of claim 1, wherein when the lighting device is connected to the AC power supply directly, the common end of the first single-pole double-throw switch is connected to the L1S end of the switch-mode power supply module, the common end of the second single-pole double-throw switch is connected to the L2S end of the switch-mode power supply module, the common end of the third single-pole double-throw switch is connected to the N1S end of the switch-mode power supply module, and the common end of the fourth single-pole double-throw switch is connected to the N2S end of the switch-mode power supply module.

3. The lighting device of claim 1, wherein the direct-current driven lighting module comprising n direct-current driven light-emitting elements arranged in sequence $D_1, \ldots, D_n$ and 2×(n−1) single-pole double-throw switches $S_{11}$, $S_{12}, \ldots, S_{(n-1)1}, S_{(n-1)2}$, n is an integer greater than 1, each light-emitting element has the high voltage end and low voltage end, and each single-pole double-throw switch has a parallel coupling pole, a serial coupling pole, and the public pole;

wherein the high voltage end of the light-emitting element $D_i$ is connected to the parallel coupling pole of the single-pole double-throw switch $S_{i1}$, the low voltage end of the light-emitting element $D_i$ is connected to the public pole of the single-pole double-throw switch $S_{i2}$, the serial coupling pole of the single-pole double-throw switch $S_{i1}$ is connected to the serial coupling pole of the single-pole double-throw switch $S_{i2}$, the high voltage end of the light-emitting element $D_{i+1}$ is connected to the public pole of the single-pole double-throw switch $S_{i1}$, the low voltage end of the light-emitting element $D_{i+1}$ is connected to the parallel coupling pole of the single-pole double-throw switch $S_{i2}$; i is an integer ranged from 1~(n-1), the high voltage end of the light-emitting element $D_1$ and the low voltage end of the light-emitting element $D_n$ are connected to the positive pole and negative pole of a direct-current source, respectively.

4. The lighting device of claim 3, wherein each light-emitting element in the direct-current driven lighting module is a light-emitting diode, and the high voltage end and low voltage end of each light-emitting element are a positive pole and a negative pole of the light-emitting diode, respectively.

5. The lighting device of claim 3, wherein each light-emitting element comprises multiple subsidiary light-emitting elements and these subsidiary light-emitting elements are serial and/or parallel connected to each other.

6. The lighting device of claim 3, wherein each single-pole double-throw switch is embodied as a DIP switch or a transistor.

7. The lighting device of claim 3, wherein m number of single-pole double-throw switches of the 2×(n−1) single-pole double-throw switches $S_{11}$, $S_{11}$, $S_{12}$, . . . , $S_{(n-1)1}$, $S_{(n-1)2}$ are embodied as one m-pole double-throw switch, and m is an integer greater than 1.

8. The lighting device of claim 3, wherein the 2×(n−1) single-pole double-throw switches $S_{11}$, $S_{12}$, . . . , $S_{(n-1)1}$, $S_{(n-1)2}$ are embodied as a r-pole s-throw switch, r and s are positive integer.

9. The lighting device of claim 3, wherein when the public poles of two single-pole double-throw switches connected between two neighboring light-emitting elements are connected to the parallel coupling pole, the two neighboring light-emitting elements are parallel connected to each other; when the public pole of two single-pole double-throw switches connected between two neighboring light-emitting elements are connected to serial coupling pole, the two neighboring light-emitting elements are serially connected to each other.

* * * * *